June 3, 1952     S. C. HOARE     2,599,258
SUPPLY VOLTAGE VARIATION COMPENSATION
Filed June 10, 1949
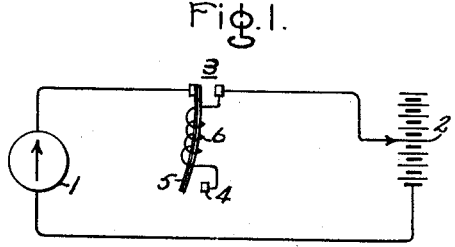
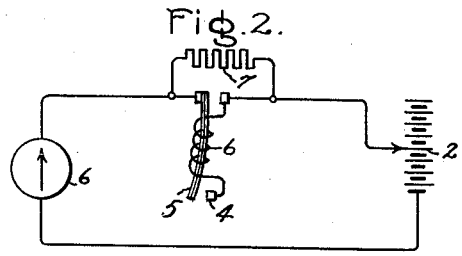
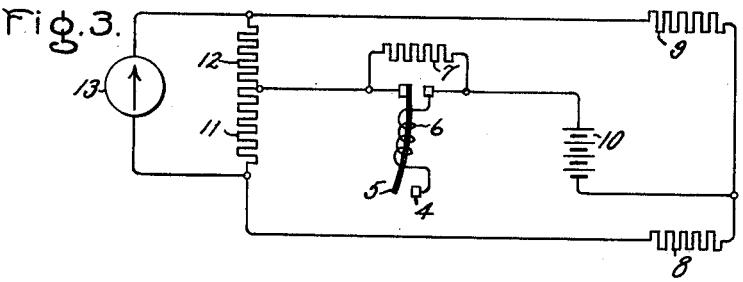
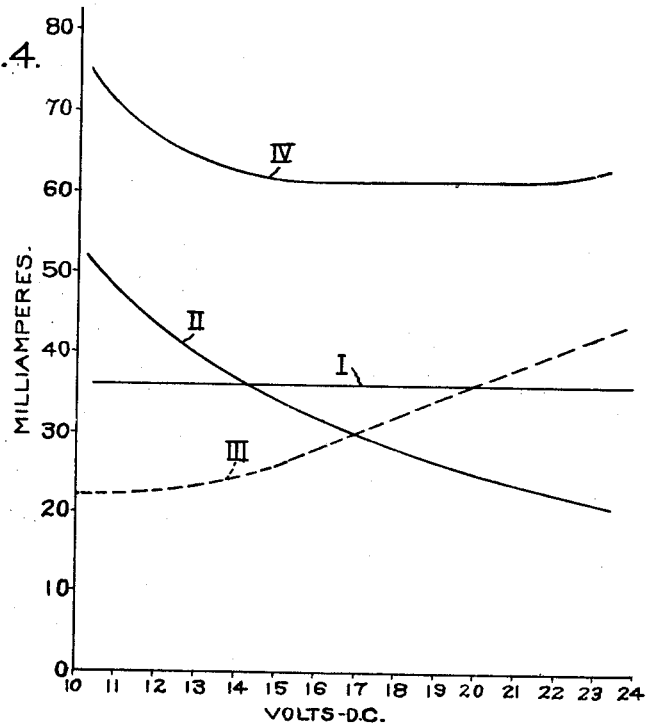
Inventor:
Stephen C. Hoare,
by Pravell & Mack
His Attorney.

Patented June 3, 1952

2,599,258

UNITED STATES PATENT OFFICE 2,599,258

SUPPLY VOLTAGE VARIATION COMPENSATION

Stephen C. Hoare, Manchester, Mass., assignor to General Electric Company, a corporation of New York Application June 10, 1949, Serial No. 98,355

3 Claims. (Cl. 175—183)

1

My invention relates to improved apparatus for compensating electric circuits for variations in the voltage of the source of supply thereto and is particularly useful for use in connection with measuring circuits. In carrying my invention into effect, I employ a regulator consisting of a switch in the circuit to be regulated, a thermal responsive bimetallic element for opening and closing the switch which is heated by the regulated current, and a resistance in shunt to the switch and heater. It has been found that the average current through the regulator will be constant over a considerable range of variation in the supply voltage.

The features of my invention which are believed to be novel and patentable will be pointed out in the claims appended hereto. For a better understanding of my invention reference is made in the following description to the accompanying drawing in which Fig. 1 shows a measuring circuit explanatory of the evolution of my invention. Fig. 2 shows a measuring circuit involving my invention, and Fig. 3 shows a differential measuring circuit involving my invention. Fig. 4 shows instrument response-supply voltage variation curves of different circuit arrangements explanatory of my invention.

In Fig. 1 at 1 there is represented an electrical measuring instrument assumed to be of the root mean square current measuring type; that is, a meter that measures the heating value of the current therethrough. It may be of the simple thermal responsive bimetallic type. Such instrument is supplied from a variable voltage source of supply 2 through a thermal responsive switch or regulator at 3. The regulator consists of a stationary contact 4 and a thermal responsive bimetallic strip 5 cooperating with contact 4 to form a switch in the circuit shown, and also a resistance heater 6 for heating the strip 5 and connected in series with the switch. The regulator 3 is arranged to close the circuit when the bimetallic strip 5 is cool or at normal ambient temperature, and to have the bimetallic strip bend away from contact 4 to open the circuit and interrupt the heating current, as shown, when the strip is hot. Some heating may be contributed by current flow through the bimetallic strip as well as that through the heater.

A regulator of this type will operate to open and close the circuit. Thus, in Fig. 1, as soon as the bimetallic strip 5 cools, it will move against contact 4 closing the circuit. Heater 6 will heat the strip and it will bend away and open the circuit. When the supply voltage is low, heating

2 is slower and the circuit remains closed longer than when the supply voltage is high and heating is faster. The current pulses thus produced pass through meter I, and it measures the root mean square value of such current pulses. As might be expected, the pulsating current as measured by this meter remains constant over a wide range of variation in the voltage supplied to the circuit, since it measures the heating value of such current which is proportional to the heating supplied to the regulator at 3.

In Fig. 4 the abscissas represent the voltage supplied to the circuit and the ordinates represent the current in milliamperes as measured by meter I in terms of root mean square value. It is found that the current as thus measured when the voltage supplied to the circuit is varied over the range indicated is constant as shown by curve I. Hence, if one is interested in obtaining a constant root mean square value of current from a source of supply which varies in voltage value, a regulator such as shown in Fig. 1 will produce this result.

If, now, in Fig. 1, I substitute for meter I a d'Arsonval measuring instrument which measures the average value of current and repeat the experiment, it is found that the instrument response-voltage variation curve will be as shown in curve II, Fig. 4. Thus, the average value of current in the circuit decreases as the voltage increases very appreciably.

In Fig. 2, I have shown a circuit much like that of Fig. 1, except that that the instrument contained therein at 6 is a d'Arsonval instrument which measures average current value, and a resistance 7 is connected in shunt to the regulator of Fig. 1. Such combination of the regulator 3 of Fig. 1 and the shunt 7 constitutes a new and different regulator. In Fig. 2 the shunt resistance 7 passes current in proportion to the supply voltage when the thermal switch is open. It also passes some current when the switch is closed, but this is small in comparison to that passed when the switch is open because closing the switch largely short circuits the resistance. The duration of switch closure per current pulse therethrough is inversely proportional to the supply voltage. Hence, the proportion of total time during which the shunt resistance passes high current increases with the voltage, and hence, the average current passed by the shunt increases with rise in voltage as the average current through the switch decreases with rise in voltage. By suitably proportioning the value of the resistance of the shunt 7 to the resistance of the heater 6 and the resistance of the remainder of the circuit, the regulator of Fig. 2 may be made to supply a constant average current over a considerable range of voltage variation.

Curve II, Fig. 4, represents the average current passed by the thermal switch in Fig. 1. It may also represent with reasonable accuracy the average current passed by the thermal switch in Fig. 2. Dotted line curve III represents the average current passed by the shunt resistance 7 of Fig. 2. Then the total average current passed by the regulator of Fig. 2 is the sum of curves II and III which is curve IV. It is noted that the total average current passed by the regulator of Fig. 2 is constant over a range of voltage variation from about 15 to 21 volts as measured by a well damped d'Arsonval instrument 6, or over a range of ±15 per cent from the 18-volt value. Curve II was obtained using a 1. ohm milliammeter, a 24-volt storage battery source of supply with a tap for varying the voltage, and a Nichrome thermal switch heater resistance of 60. ohms cold. Curve IV was obtained with the same elements but with a 500. ohm shunt resistance at 7.

In Fig. 3, I have represented my constant average current regulator in a differential measuring circuit for measuring the temperature of a temperature sensitive resistance detector represented at 8. At 9 is a resistor comparable to 8 but having a negligible temperature coefficient of resistance and subject to small temperature variations. At 10 is a direct current source of supply which is assumed to vary in voltage over a range of ±15 per cent. Such source supplies two parallel circuits through my regulator which has been previously described. One of these circuits contains the temperature sensitive resistance 8 and a constant resistance 11; and the other branch contains the resistance 9 and a constant resistance 12 comparable to 11. A four-arm resistance bridge circuit is thus formed in which one arm 8 varies with temperature. A well damped zero center d'Arsonval millivoltmeter 13 is connected across the bridge as shown. At some mid-temperature point of resistance 8 the bridge is balanced and the zero center point of the instrument 13 scale is marked with such temperature. Then as the temperature varies from this point, the bridge becomes unbalanced in a direction depending upon whether the temperature at 8 rises or falls. The scale of instrument 13 is calibrated accordingly. By using my regulator with the resistance 7 suitably proportioned to the resistance of heater 6 and the load resistance so as to obtain constant average current regulation for normal voltage of source 10, no error in temperature measurement is occasioned by variations in voltage of source 10 over a range of ±15 per cent from normal.

What I claim as new and desire to secure by Letters Patent of the United States is:

1. An electric circuit including a load, a source of supply therefor, and a regulator connected in series between the source of supply and load for maintaining the average load current constant when the voltage of the source of supply varies, said regulator comprising a thermal responsive switch which is closed at ambient temperature and which opens when heated above ambient temperature, electric heater means traversed by current flow through said switch for heating the switch when closed and thereby causing it to open and interrupt such heating whereupon the switch cools again and the action is repeated, said thermal switch having a closure period which is substantially inversely proportional to the supply voltage, and a resistance connected in shunt to said switch and heater means, for passing current around said switch when the switch is open, said resistance having such value that the total average current passed by both the switch and resistance remains constant over a wide variation in the circuit supply voltage.

2. In combination with an electric measuring circuit having a source of supply voltage which varies from normal and a measurement load supplied thereby, regulating means connected in series relation in said circuit between said source and measurement load comprising a resistance connected in parallel with a thermal responsive switch, the thermal responsive switch being biased closed at ambient temperature and subject to heating by current passing therethrough to cause the switch to open, whereby the switch opens and closes repeatedly as it is heated and cooled, the switch having a closure time per operating cycle which is inversely proportional to the supply voltage, said parallel connected resistance having a value such that the total average current passed by the switch and resistance in said circuit remains constant for ±15 variations from normal in the supply voltage.

3. A measuring circuit comprising a source of supply, a four-arm bridge supplied from said source, one arm comprising an impedance the value of which varies in proportion to the quantity to be measured, a well damped d'Arsonval measuring instrument connected across said bridge to indicate the direction and extent of unbalance of said bridge due to variations in said variable impedance arm and a current regulator connected in the supply to said bridge from said source comprising a resistance and a thermal responsive switch connected in parallel, said thermal responsive switch being biased to a closed position at ambient temperature and subject to heating by current passing therethrough to cause it to open, whereby it repeatedly opens and closes as it heats and cools, said regulator being designed and serving to compensate said measuring circuit for appreciable variations in the voltage of its source of supply, and the opening and closing regulating action of said thermal responsive switch being sufficiently rapid in relation to the damping of said instrument that the latter is nonresponsive to such regulating action.

STEPHEN C. HOARE.

REFERENCES CITED

The following references are of record in the file of this patent:

UNITED STATES PATENTS

| Number | Name | Date |
| --- | --- | --- |
| 1,231,221 | Trosdahl | June 26, 1917 |
| 1,584,892 | Phelps | May 18, 1926 |
| 1,741,601 | Appelberg | Dec. 31, 1929 |
| 1,806,796 | Gates | May 26, 1931 |
| 1,979,349 | Schmitinger | Nov. 6, 1934 |
| 2,091,255 | Coleman et al. | Aug. 31, 1937 |
| 2,484,030 | Hastings et al. | Oct. 11, 1949 |